United States Patent
Kang

(10) Patent No.: US 11,733,805 B2
(45) Date of Patent: Aug. 22, 2023

(54) DISPLAY DEVICE WITH MITIGATED LOW FREQUENCY NOISE AND OPERATION METHOD THEREOF

(71) Applicant: LG Display Co., Ltd., Seoul (KR)

(72) Inventor: Yeonwook Kang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/541,994

(22) Filed: Dec. 3, 2021

(65) Prior Publication Data

US 2022/0206660 A1 Jun. 30, 2022

(30) Foreign Application Priority Data

Dec. 29, 2020 (KR) .................. 10-2020-0186709

(51) Int. Cl.
*G06F 3/041* (2006.01)
*G09G 3/20* (2006.01)

(52) U.S. Cl.
CPC ........ *G06F 3/04182* (2019.05); *G06F 3/0412* (2013.01); *G09G 3/2092* (2013.01); *G06F 3/04166* (2019.05); *G06F 3/04184* (2019.05); *G09G 2310/0275* (2013.01); *G09G 2310/08* (2013.01); *G09G 2330/06* (2013.01); *G09G 2340/0435* (2013.01)

(58) Field of Classification Search
CPC ............. G06F 3/04184; G06F 3/04166; G06F 3/0412; G06F 3/04182; G09G 3/2092; G09G 2310/0275; G09G 2310/08; G09G 2340/0435; G09G 2330/06; G09G 2354/00

USPC .......................................... 345/173, 99, 213
See application file for complete search history.

(56) References Cited

U.S. PATENT DOCUMENTS

| | | | |
|---|---|---|---|
| 2015/0185956 A1* | 7/2015 | Takayama | G06F 3/0446 345/174 |
| 2016/0077617 A1* | 3/2016 | Lee | G06F 3/04184 345/173 |
| 2018/0188863 A1 | 7/2018 | Yi et al. | |
| 2019/0279600 A1 | 9/2019 | Chan et al. | |
| 2021/0149540 A1* | 5/2021 | Shikata | G09G 3/20 |

FOREIGN PATENT DOCUMENTS

| | | |
|---|---|---|
| CN | 103903544 A | 7/2014 |
| CN | 107340907 A | 11/2017 |
| CN | 107977112 A | 5/2018 |
| CN | 110827737 A | 2/2020 |
| CN | 111427463 A | 7/2020 |

* cited by examiner

*Primary Examiner* — Jimmy H Nguyen
(74) *Attorney, Agent, or Firm* — Birch, Stewart, Kolasch & Birch, LLP

(57) ABSTRACT

A display device can include a display panel including a plurality of pixels and touch electrodes configured to sense a touch input, and a timing controller configured to generate a vertical synchronization signal and a horizontal synchronization signal for controlling the display panel to display an image based on an image signal, and adjust the horizontal synchronization signal by varying a horizontal time period corresponding to a time period interval for individual cycles of the horizontal synchronization signal.

18 Claims, 7 Drawing Sheets

[Fig. 1]
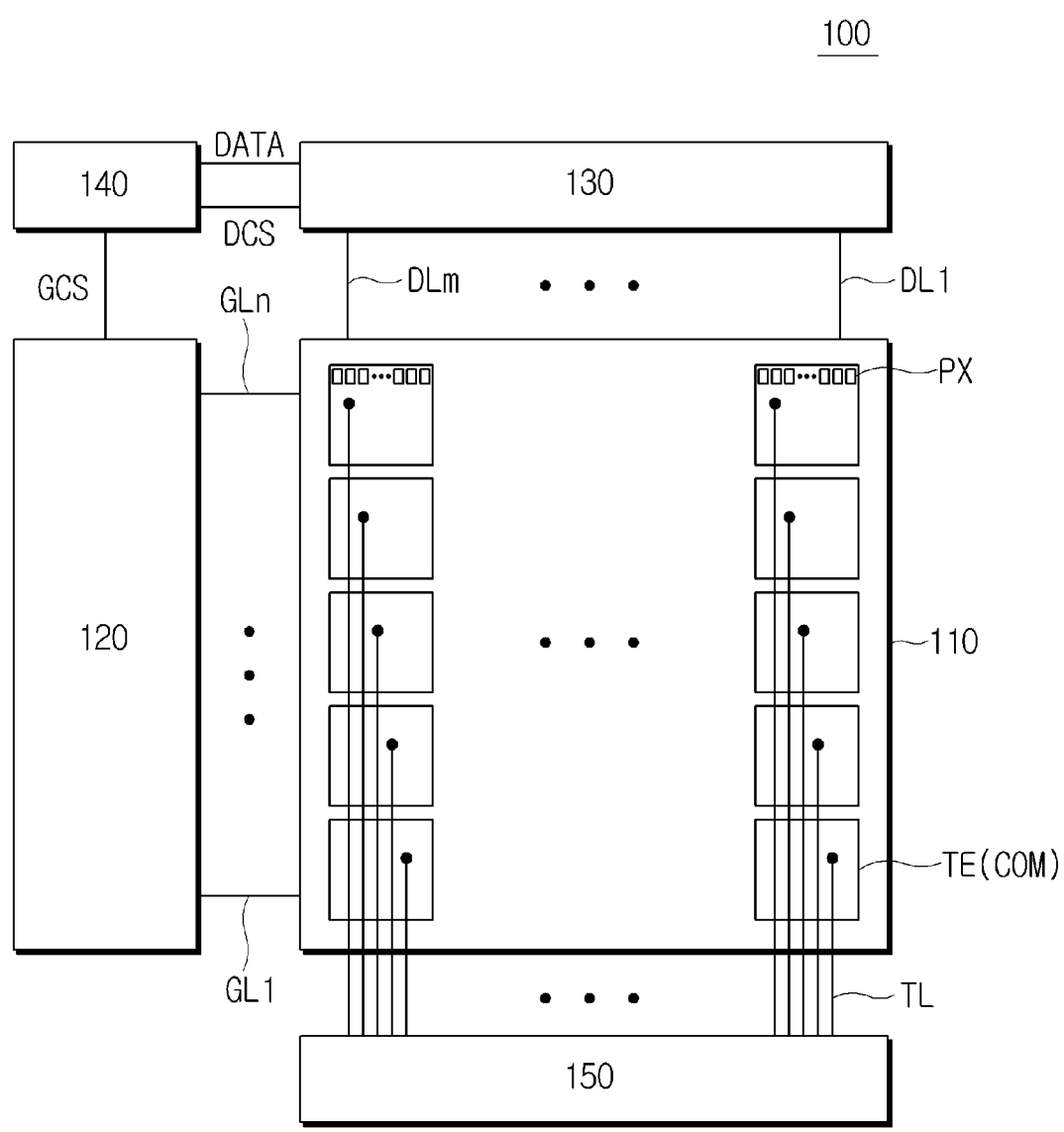

[Fig. 2]
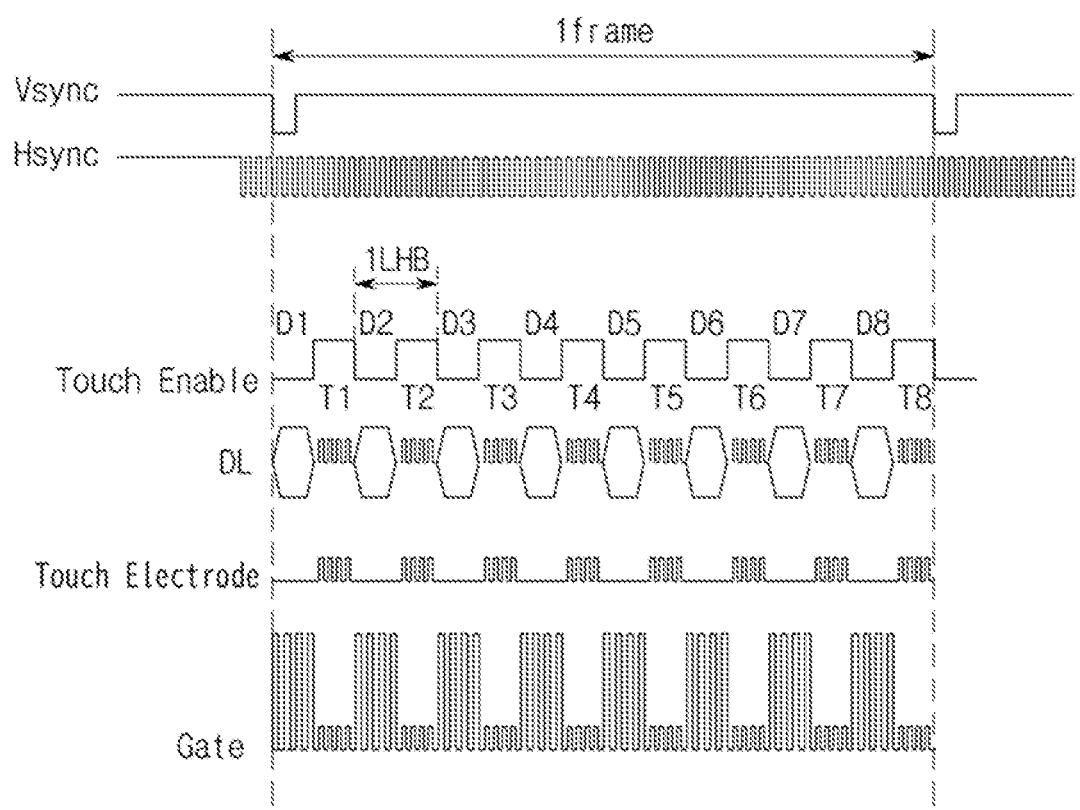

[Fig. 3]
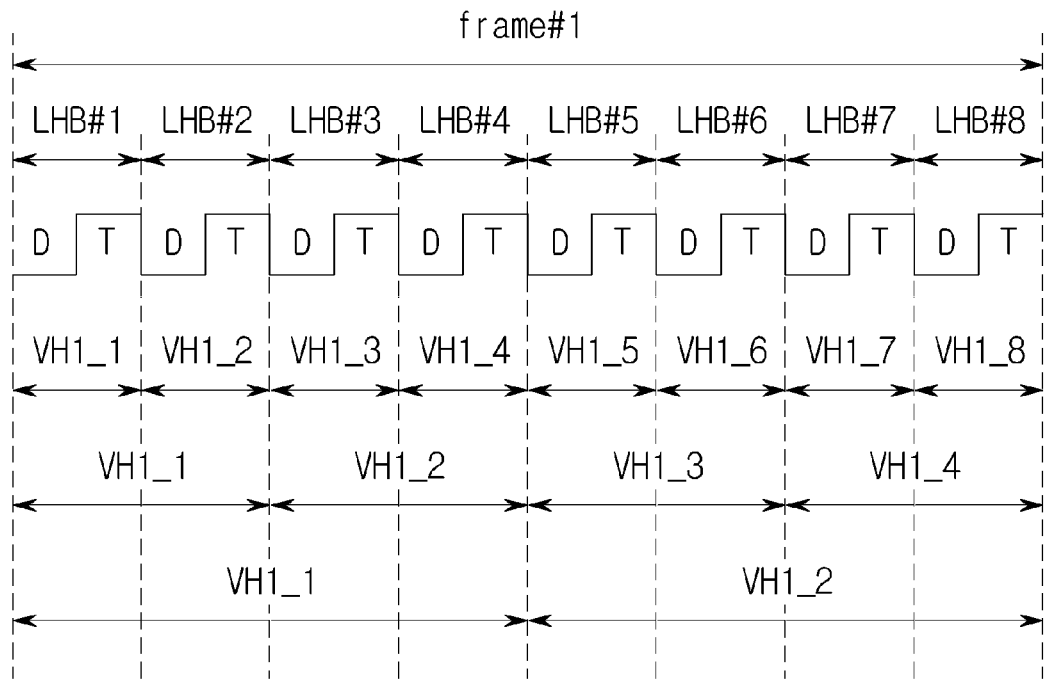
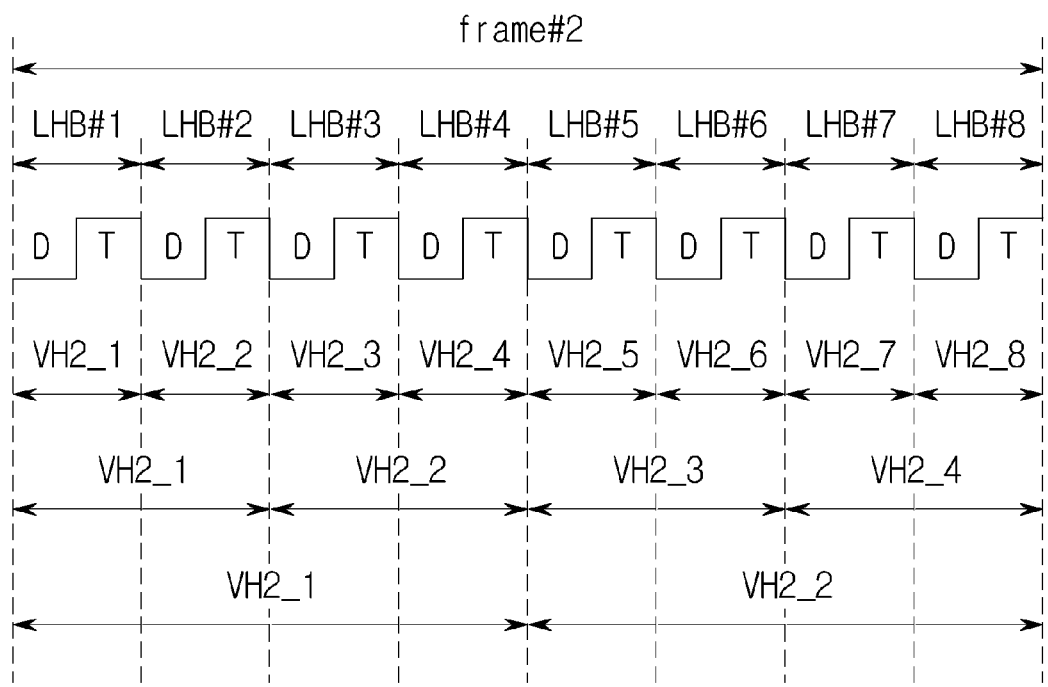

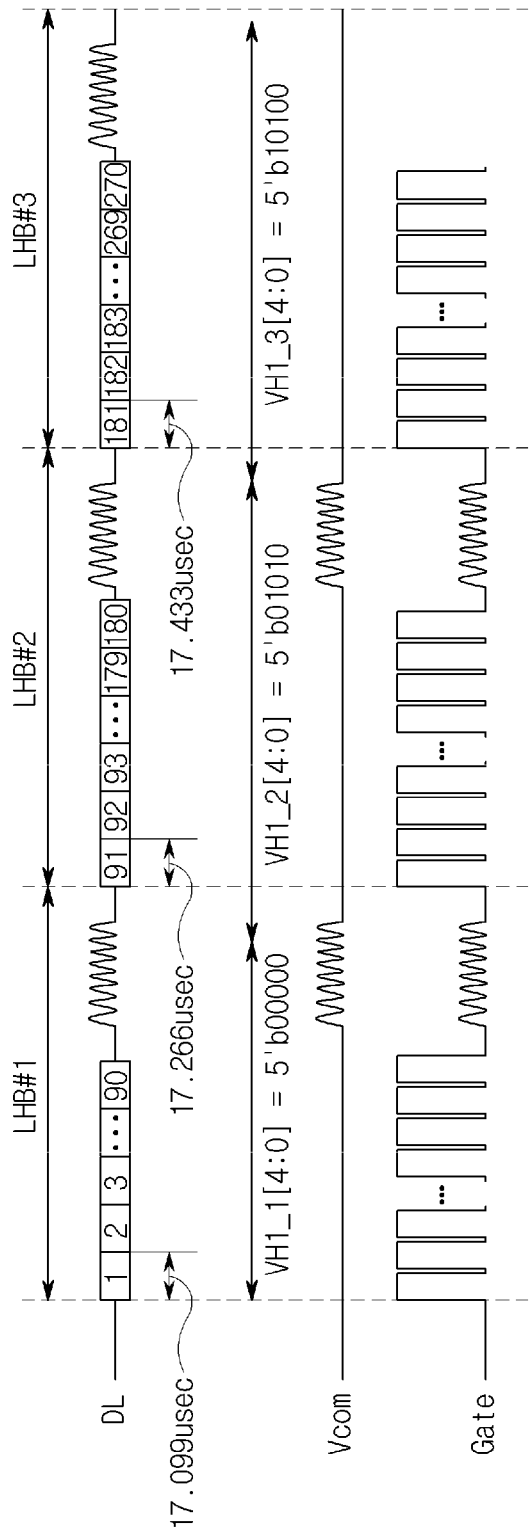
[Fig. 4]

[Fig. 5]
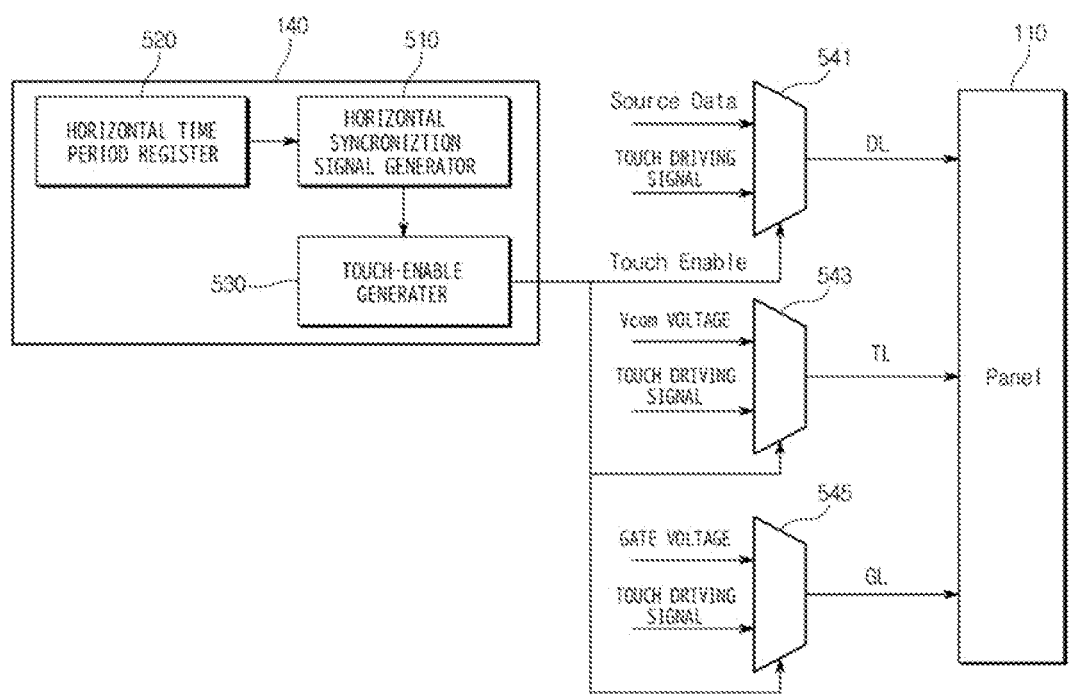

[Fig. 6]

| | LHB#1 | LHB#2 | LHB#3 | LHB#4 | LHB#5 | LHB#6 | LHB#7 | LHB#8 | LHB#9 | LHB#10 | LHB#1 | LHB#2 | LHB#3 | ... |
|---|---|---|---|---|---|---|---|---|---|---|---|---|---|---|
| (a) | 0 | 1 | 2 | 3 | 4 | 5 | 6 | 7 | 0 | 1 | 2 | 3 | 4 | ... |
| (b) | 0 | 2 | 4 | 6 | 0 | 2 | 4 | 6 | 0 | 2 | 4 | 6 | 0 | ... |
| (c) | 0 | 3 | 6 | 2 | 5 | 0 | 3 | 6 | 2 | 5 | 0 | 3 | 6 | ... |
| (d) | 4 | 7 | 3 | 2 | 0 | 5 | 5 | 1 | 0 | 6 | 4 | 6 | 7 | ... |
| (e) | 0 | 1 | 2 | 3 | 4 | 5 | 6 | 7 | 6 | 5 | 4 | 3 | 2 | ... |

Frame#1 — Frame#2

[Fig. 7]
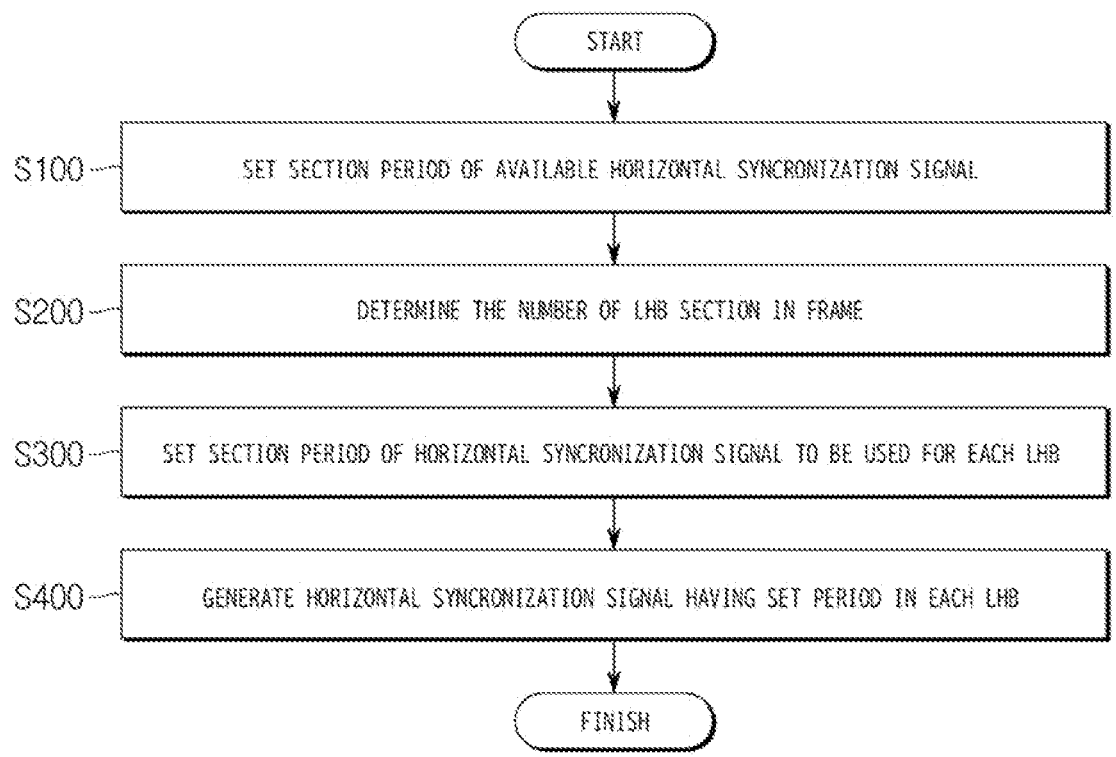

DISPLAY DEVICE WITH MITIGATED LOW FREQUENCY NOISE AND OPERATION METHOD THEREOF

CROSS REFERENCE TO RELATED APPLICATION

The present application claims priority to Korean Patent Application No. 10-2020-0186709, filed on Dec. 29, 2020 in the Republic of Korea, the entire contents of which are incorporated by reference into the present application.

BACKGROUND OF THE INVENTION

Field of the Invention

The present disclosure relates to a display device with mitigated low-frequency noise, and to an operation method thereof.

Description of the Related Art

With the advancement of an information-oriented society, various types of display devices have been developed. Recently, display devices using various techniques, such as a liquid crystal display (LCD), a plasma display panel (PDP), and an organic light emitting display (OLED), have been commercialized.

In addition, as the display devices are employed in mobile products, the display device can include a touch type input processing an operation depending on a user's convenience and device characteristics. Accordingly, the display device can perform a display driving operation of displaying an image on a display panel and a touch driving operation of sensing the user's touch input.

As for a display device, there are an on-cell type display device in which a touch electrode for sensing the user's touch is directly formed on a display panel and an in-cell type display device in which a touch electrode is formed in a display panel. In the on-cell type display device, display driving and touch driving may be independently driven. In the in-cell type display device, a time-division driving method that temporally divides a display driving section and a touch driving section may be used.

In a time-division driving method, display driving and touch driving can be driven by fixing and time-divisionally dividing a display driving time and a touch driving time during one frame at a constant ratio. In the time-division driving method, since the display driving time and the touch driving time are fixed at the constant ratio, a signal is turned-on and turned-off in a constant cycle, and a generated frequency component due to such a time-division driving method may act as electromagnetic interference (EMI) noise or audible noise.

SUMMARY OF THE INVENTION

Electromagnetic interference (EMI) noise may be caused by a frequency component that is generated as a horizontal synchronization (Hsync) signal determining a horizontal time 1H cycle is generated with a fixed cycle.

In order to mitigate such EMI noise, the present disclosure is intended to propose a method of varying the horizontal time cycle for each line and/or for each frame.

The technical problem and issues to be addressed by the present disclosure are not limited to the above-mentioned problem and issues, and other problems and issues that are not mentioned will be clearly understood by those skilled in the art from the following description.

According to an embodiment of the present disclosure, a display device of the present disclosure includes a display panel including a plurality of pixels arranged in a matrix form at intersection portions of a plurality of data lines and a plurality of gate lines and including a touch electrode for recognizing a touch input; a timing controller configured to generate a control signal including a vertical synchronization signal and a horizontal synchronization signal to process an image signal and a control signal that are received from outside and to output the image signal to the display panel; a data driver configured to output a data voltage to each of a plurality of data lines of the display panel; a gate driver configured to output a gate signal to each of a plurality of gate lines of the display panel; and a touch driver configured to provide a touch driving signal to the touch electrodes of the display panel, in which the timing controller may generate the horizontal synchronization signal such that a horizontal time representing a time interval between the horizontal synchronization signals is varied.

According to various embodiments of the present disclosure, a method of operating a display device including a display panel that includes a plurality of pixels arranged in a matrix form at intersection portions of a plurality of data lines and a plurality of gate lines, a touch electrode for recognizing a touch input, and a timing controller configured to generate a control signal including a vertical synchronization signal and a horizontal synchronization signal to process an image signal and a control signal that are received from outside and to output the image signal to the display panel, in which the method includes generating the horizontal synchronization signal such that a horizontal time representing a time interval between the horizontal synchronization signals is varied.

Various methods proposed in the present disclosure have an effect of mitigating low-frequency (EMI) noise caused by a display device (e.g., by about 8 dB).

The effects that can be obtained from the present disclosure are not limited to the above-mentioned effects, and other effects not mentioned herein will be clearly understood by those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a view schematically illustrating a configuration of a display device according to an embodiment of the present disclosure;

FIG. 2 is a view illustrating an operation example of a long horizontal blank (LHB) manner according to an embodiment of the present disclosure;

FIG. 3 is a view illustrating various examples of variably setting a horizontal time according to embodiments of the present disclosure;

FIG. 4 is a view illustrating an example of generating the horizontal times having different periods from each other according to various embodiments of the present disclosure;

FIG. 5 is a view illustrating a circuit related to generating a horizontal synchronization signal for forming a variable period horizontal time according to various embodiments of the present disclosure;

FIG. 6 is a view illustrating examples of determining a horizontal time period by a method other than using a horizontal time period register in FIG. 5, in which the horizontal time period will be used in each MB section according to an embodiment of the present disclosure; and FIG. 7 is a view illustrating a method of generating the variable period horizontal time by a timing controller, according to various embodiments of the present disclosure.

With regard to the description of the drawings, the same or similar reference numerals may be used for the same or similar components.

DETAILED DESCRIPTION OF THE EMBODIMENTS

In the following description of the embodiments and the drawings, the same or similar elements are denoted by the same reference numerals throughout the specification. In addition, in the drawings, the thickness, ratios, and size of the elements may be exaggerated for effective description of the technical details.

In this specification, it will be understood that when one component (or region, layer, portion) is referred to as being "on," "connected to," or "coupled to" another component, it can be directly disposed/connected/coupled on/to the one component, or an intervening third component may also be present. Also, the terms "under," "below," "above," "over," "upper," and the like are used for explaining relation association of components illustrated in the drawings. These terms are relative concepts and are described based on the direction in the drawings. It is to be understood that terms such as "including," "having," etc. are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

The term "and/or" includes one or more combinations that the associated elements may define. Terms "first," "second," etc. can be used to describe various elements, but the elements are not to be construed as being limited to the terms. The terms are only used to differentiate one element from other elements. For example, the "first" element may be named the "second" element without departing from the scope of the embodiments, and the "second" element may also be similarly named the "first" element. The terms of a singular form may include plural forms unless referred to the contrary.

In the following description of the embodiments of the present disclosure, a detailed description of known functions and configurations incorporated herein will be omitted when it can make the subject matter of the present disclosure rather unclear. Further, the names of elements used in the following description of the embodiments of the present disclosure are selected in consideration of ease of preparation of the specification, and can thus differ from the names of parts of an actual product.

Hereinafter, various embodiments of the present disclosure will be described in detail according to the order of the attached drawings. All the components of each display device according to all embodiments of the present disclosure are operatively coupled and configured.

FIG. 1 is a view schematically illustrating a configuration of a display device according to an embodiment of the present disclosure.

Referring to FIG. 1, a display device 100 according to the embodiment of the present disclosure can include a display panel 110, a gate driver 120, a data driver 130, a timing controller 140, and a touch driver 150.

In the display panel 110, multiple pixels PXs are disposed. The pixels PXs can be formed at intersection portions of gate lines GL1 to GLn and data lines DL1 to DLm, where n and m can be positive numbers such as positive integers. For example, the pixels PXs can be arranged in a matrix form on the display panel 110 that is a touch-integrated display panel.

Each pixel PX can be connected to the corresponding gate line GL1 to GLn and the corresponding data line DL1 to DLm. Such pixels PXs can emit light with corresponding luminance depending on data signals that are supplied to the data lines DL1 to DLm in synchronization with a supply timing of gate signals supplied to the gate lines GL1 to GLn.

Depending on a type of the display device 100, the pixels PXs can include liquid crystals or light emitting elements (e.g., OLED's). For example, when the display device 100 is a liquid crystal display device, the display device 100 can include a light source (for example, a backlight unit). The light source can emit light to the display panel 110, and each pixel PX can include a pixel electrode, a common electrode COM, and the liquid crystals. An electric field is formed between the pixel electrode and the common electrode COM in response to a data voltage applied to the pixel PX. An arrangement of the liquid crystal can be adjusted. Therefore, a transmittance of light emitted from the light source is adjusted, so that each pixel PX can emit light with luminance corresponding to the data signal.

Otherwise, for example, when the display device 100 is an organic light emitting display device (e.g., an OLED display device), each pixel PX can include an organic light emitting diode. At this time, a driving current flowing to the organic light emitting diode is controlled depending on a voltage of the data signal, so that each pixel PX can emit light with luminance corresponding to the data signal.

The gate driver 120, the data driver 130, and the timing controller 140 can form a display driver of the display device 100.

The gate driver 120 is connected to the pixels PXs of the display panel 110 through the gate lines GL1 to GLn. The gate driver 120 generates a gate signal based on a gate driving control signal GCS output from the timing controller 140. The gate driver 120 can provide the generated gate signals to the pixels PXs through the gate lines GL1 to GLn.

The data driver 130 is connected to the pixels PXs of the display panel 110 through the data lines DL1 to DLm. The data driver 130 can generate a data signal based on image data DATA and a data driving control signal DCS. An image data DATA and a data driving control signal DCS can be output from the timing controller 140. The data driver 130 can provide the generated data signals to the pixels PXs through the data lines DL1 to DLm.

The timing controller 140 can generate the image data DATA, the gate driving control signal GCS, and the data driving control signal DCS. The timing controller 140 can process an image signal and a control signal (for example, a horizontal synchronization signal (Hsync), a vertical synchronization signal (Vsync), a main clock signal, and so on). Such signals can be received from outside to be suitable for operating conditions of the display panel 110.

In the embodiment, the display panel 110 can be implemented as a touch-integrated display panel capable of sensing a touch input. To this end, the display panel 110 can include multiple touch electrodes TEs.

The touch electrodes TEs can be disposed outside the pixel PX or can be embedded in a pixel cell. The touch electrodes TEs can be electrodes disposed separately for touch sensing or can be electrodes used for display driving. That is, any one of the electrodes of the pixel PX placed for display driving can be used as the touch electrode TE.

For example, when the display device 100 is the liquid crystal display device, the touch electrode TE can be the common electrode COM. The common electrode COM can be embedded in the display panel 110. A common voltage Vcom is applied to the common electrode COM during display driving. Alternatively, when the display 100 is the organic light emitting display device, the touch electrode TE can be one electrode (for example, a cathode electrode) of the organic light emitting diode.

Since the electrode used for the display driving also functions as the touch electrode TE, display driving and touch driving can be temporally divided.

In the following description, embodiments will be described with respect to a situation in which the display device 100 is implemented as the liquid crystal display device. However, the embodiments are not limited thereto.

In an embodiment, the touch electrode TE can be configured in a size corresponding to the m pixels PXs grouped in units of blocks. Such touch electrodes TEs can be implemented by dividing and patterning the common electrode COM into a size corresponding to the m pixels PXs. However, the embodiment is not limited thereto.

Each touch electrode TE is connected to the touch driver 150 through a touch line TL. Each touch electrode can sense an external touch input in response to a touch driving signal received from the touch driver 150.

The touch driver 150 is connected to the touch electrodes TEs through the touch lines TL. The touch driver 150 outputs the touch driving signal to the touch electrode TE. The touch driver 150 senses a touch input by receiving a touch sensing signal from the touch electrode TE. In an embodiment, the display panel 110 can be configured to sense the touch input by a self-capacitance method. In this embodiment, the touch driver 150 can sense the touch input through a change in capacitance identified from the touch sensing signal.

The gate driver 120, the data driver 130, the timing controller 140, and the touch driver 150 can be configured as separate integrated circuits (ICs), or ICs in which at least some portions thereof are integrated. For example, the data driver 130 can be configured as an integrated circuit integrated with the timing controller 140 and/or the touch driver 150.

In addition, in FIG. 1, the gate driver 120 and the data driver 130 are illustrated as elements separated from the display panel 110. However, at least one among the gate driver 120 and the data driver 130 or both can be configured in an in-panel manner. By in-panel manner, such a driver can be formed integrally with the display panel 110. For example, the gate driver 120 can be formed integrally with the display panel 110 according to a gate-in-panel (GIP) manner.

For a manner of temporally dividing display driving and touch driving, a vertical blank (VB) manner and a long horizontal blank (LHB) manner can be used.

FIG. 2 is a view illustrating an operation example of a long horizontal blank (LHB) manner.

Referring to FIG. 2, the vertical synchronization signal (Vsync) is a reference signal. The vertical synchronization signal can define one frame time by temporally representing a start and an end of one screen. Accordingly, a start of the frame can be synchronized with a start of the vertical synchronization signal (Vsync). An end of the frame can be synchronized with a start of a next vertical synchronization signal (Vsync).

Multiple horizontal synchronization signals (Hsyncs) can be generated in one frame. The horizontal synchronization signal (Hsync) can be a reference signal temporally indicating that one gate line is driven. Accordingly, one gate line can be turned-on at a start of the horizontal synchronization signal (Hsync). The gate line can be turned-off at a start of a next horizontal synchronization signal (Hsync) and another gate line can be turned-on. A section between the horizontal synchronous signals Hsyncs can be referred to as a horizontal time 1H. The horizontal time 1H typically can have a constant value. That is, the horizontal synchronization signal (Hsync) is generated in a constant cycle.

A touch-enable signal can be used to distinguish a display driving section and a touch driving section. According to an embodiment, a situation in which the touch-enable signal is high can be represented as the touching driving sections T1 to T8. Also, a situation in which the touch-enable signal is low can be represented as the display driving sections D1 to D8. In contrast, a situation in which the touch-enable signal is low can be represented as touch driving sections. A situation in which the touch-enable signal is high can be represented as display driving sections.

In FIG. 2, a signal applied to the data line is represented as DL, a signal that appears on entire gate lines GL1 to GLn is represented as Gate. A signal applied to the touch electrode TE is represented as TE.

As illustrated in FIG. 2, in the LHB manner, the display driving sections D1 to D8 and the touch driving sections T1 to T8 can appear in an alternating manner.

In the display driving sections D1 to D8, the gate signal Gate can be applied to the gate lines GL1 to GLn in response to the horizontal synchronization signal (Hsync). The data signal DL can be applied to the data lines DL1 to DLm. In the touch driving sections T1 to T8, the touch driving signal can be applied to the touch electrode TE.

The period for one display driving section and one touch driving section can be referred to as 1 LHB section.

When the horizontal synchronization signal (Hsync) is generated in a constant cycle as illustrated in FIG. 2, electromagnetic interference (EMI) noise or audible noise may occur. Therefore, in order to mitigate the EMI noise or the audible noise (e.g., a constant buzzing or humming sound), a generation cycle of the horizontal synchronization signal (Hsync) can be varying. For example, the horizontal synchronization signal (Hsync) can be adjusted during one frame so that the Hsync signal is slight sped up for some portions of the frame and slightly slowed down for other portions. According to an embodiment, the generation cycle of the horizontal synchronization signal (Hsync) can be set differently for each 1 LHB section within one frame. According to another embodiment, the generation cycle of the horizontal synchronization signal (Hsync) can be set differently for each frame.

FIG. 3 is a view illustrating various examples of variably setting the horizontal time.

Referring to FIG. 3, one frame section can be divided into N (for example, N is eight) LHB sections, where N is a positive integer. Each LHB section can be formed of the display driving sections and the touch driving sections. In the example in FIG. 3, one frame is divided into eight LHB sections. However, one frame is also possible to be divided into 12, 16, or more LHB sections.

Referring to the example in FIG. 3, a period of a frame (e.g., one frame period) can be divided into a plurality of periods (or horizontal time) of LHBs. For example, the horizontal time for one LHB section corresponds one display cycle (e.g., D1) and one touch cycle (e.g., T1), during which a number of gate lines are controlled based on the Hsync signal. According to one embodiment, the period of a LHB is set different than the period of another LHB. According to an embodiment, in an LHB #1 section of a frame #1, a horizontal synchronization signal can be generated such that a horizontal time of VH1_1 period is generated. In an LHB #2 section of the frame #1, a horizontal synchronization signal can be generated such that a horizontal time of VH1_2 period is generated. In an LHB #3 section of the frame #1, a horizontal synchronization signal can be generated such that a horizontal time of VH1_3 period is generated. In an LHB #4 section of the frame #1, a horizontal synchronization signal can be generated such that a horizontal time of VH1_4 period is generated. In an LHB #5 section of the frame #1, a horizontal synchronization signal can be generated such that a horizontal time of VH1_5 period is generated. In an LHB #6 section of the frame #1, a horizontal synchronization signal can be generated such that a horizontal time of VH1_6 period is generated. In an LHB #7 section of a frame #1, a horizontal synchronization signal can be generated such that a horizontal time of VH1_7 period is generated. In an LHB #8 section of a frame #1, a horizontal synchronization signal can be generated such that a horizontal time of VH1_8 period is generated. For example, a horizontal time VH1_1 of LHB #1 can be different than a horizontal time VH1_2 of LHB #2.

According to another embodiment, a period of a horizontal time can be set to be changed for each two consecutive LHB sections in each frame section (e.g., the next two consecutive LHB sections can be made longer or shorter than the previous two consecutive LHB sections). For example, a horizontal time of LHB #1 and LHB #2 can be VH1_1. A horizontal time of LHB #3 and LHB #4 can be VH1_2. As a result, LHB #1 and LHB #2 can have same horizontal time (VH1_1). LHB #3 and LHB #4 can have same horizontal time (VH1_2). LHB #1 and LHB #2 can have a horizontal time (VH1_1) which is different than a horizontal time (VH1_2) of LHB #3 and LHB #4.

Referring to the example in FIG. 3, in an LHB #1 section and an LHB #2 section of a frame #2, a horizontal synchronization signal can be generated such that a horizontal time of VH2_1 period is generated. In an LHB #3 section and an LHB #4 section of the frame #2, a horizontal synchronization signal can be generated such that a horizontal time of VH2_2 period is generated. In an LHB #5 section and an LHB #6 section of the frame #2, a horizontal synchronization signal can be generated such that a horizontal time of VH2_3 period is generated. In an LHB #7 section and an LHB #8 section of the frame #2, a horizontal synchronization signal can be generated such that a horizontal time of VH2_4 period is generated. According to still another embodiment, a period of a horizontal time can be set to be changed for each three or four consecutive LHB sections in each frame section (e.g., after three or four consecutive LHB sections, the horizontal time period can be changed or made different for the next three or four consecutive LHB sections). According to yet another embodiment, all horizontal time generated in the frame #1 can have the same period, and all horizontal time generated in the frame #2 can have the same period. However, the period of the horizontal time in the frame #1 and the period of the horizontal time in the frame #2 can be different from each other (e.g., shorter or longer). The examples described above are merely embodiments, and the period of the horizontal times can be different from each other depending on settings of the other sections.

The period of the horizontal time for each LHB section can be changed in various manners. According to an embodiment, each time the LHB section is changed, the period of the horizontal time of the corresponding LHB section can be set to be increased by a constant size (e.g., the period of the horizontal time of each subsequent LHB section made longer by a constant amount, such as by adding an additional 0.167 us each time) from the period of the horizontal time of the previous LHB section. The period of the horizontal time of the corresponding LHB section can be set to be decreased by a constant size after reaching the maximum settable period. According to another embodiment, the minimum and maximum values of the period of the horizontal time that the LHB section can have can be set in advance. Or the period of the horizontal time of the corresponding LHB section can be set randomly by selecting a value from between the minimum value and the maximum value.

Table 1 illustrates an example of setting of the period of the horizontal time that will be generated for each LHB section of each frame, and Table 2 and Table 3 illustrate examples of horizontal time values that a setting variable VHx_y can have.

TABLE 1

|         | Frame#1 | Frame#2 | Frame#3 |
|---------|---------|---------|---------|
| LHB#1   | VH1_1   | VH2_1   | VH3_1   |
| LHB#2   | VH1_2   | VH2_2   | VH3_2   |
| LHB#3   | VH1_3   | VH2_3   | VH3_3   |
| LHB#4   | VH1_4   | VH2_4   | VH3_4   |
| LHB#5   | VH1_5   | VH2_5   | VH3_5   |
| LHB#6   | VH1_6   | VH2_6   | VH3_6   |
| LHB#7   | VH1_7   | VH2_7   | VH3_7   |
| LHB#8   | VH1_8   | VH2_8   | VH3_8   |
| LHB#9   | VH1_9   | VH2_9   | VH3_9   |
| LHB#10  | VH1_10  | VH2_10  | VH3_10  |
| LHB#11  | VH1_11  | VH2_11  | VH3_11  |
| LHB#12  | VH1_12  | VH2_12  | VH3_12  |

TABLE 2

| VHx_y  | Setting value |
|--------|---------------|
| 3'b000 | 17.099 us     |
| 3'b001 | 17.266 us     |
| 3'b010 | 17.433 us     |
| 3'b011 | 17.600 us     |
| 3'b100 | 17.767 us     |
| 3'b101 | 17.934 us     |
| 3'b110 | 18.101 us     |
| 3'b111 | 18.268 us     |

TABLE 3

| VHx_y    | Setting value |
|----------|---------------|
| 5'b00000 | 17.099 us     |
| 5'b00001 | 17.141 us     |
| 5'b00010 | 17.183 us     |
| 5'b00011 | 17.224 us     |
| 5'b00100 | 17.266 us     |
| ...      | ...           |
| 5'b01001 | 17.475 us     |
| 5'b01010 | 17.517 us     |
| 5'b01011 | 17.558 us     |
| 5'b01100 | 17.600 us     |
| ...      | ...           |

TABLE 3-continued

| VHx_y | Setting value |
|---|---|
| 5'b10100 | 17.934 us |
| 5'b10100 to 5'b11111 | Disabled |

As illustrated in Table 1, the number of LHB sections in one frame section can be set, and accordingly, a register capable of setting the period of the horizontal time for each LHB section of each frame can be provided. Each register can have horizontal time period information of a specific LHB section of a specific frame section. According to an embodiment, the number of repeated frames can be determined. As illustrated in an example in Table 1, when the number of repeated frames is determined to be three, the same horizontal time can be repeated for every third frame. Therefore, it can be sufficient to be provided with the number of registers enough to set the period of the horizontal time for each LHB section for each of the three frames. Accordingly, the setting of the horizontal time period used in the frame #1 can be equally used in a frame #4.

In addition, according to an embodiment, two consecutive LHB sections can be set to have the same period of horizontal time by setting VH1_2 to the same value of the VH1_1, by setting the VH1_4 to the same value of the VH1_3, by setting the VH1_6 to the same value of the VH1_5, by setting the VH1_8 to the same value of the VH1_7, by setting the VH1_10 to the same value of the VH1_9, and by setting the VH1_12 to the same value of the VH1_11. The period of the horizontal time generated at each LHB section of each frame can vary depending on the setting.

When each register is formed of three bits, eight horizontal time periods as illustrated in the example in Table 2 can be set. For an example, when "000" is written to the VH1_1 of Table 1, the period of the horizontal time that is generated at the LHB #1 section of the frame #1 can be 17.099 us.

According to another embodiment, when each register is formed of five bits, a maximum of 32 horizontal time periods as illustrated in Table 3 can be set. When some bit values are not used, less than 32 horizontal time periods can be set. Comparing Table 2 and Table 3, the more bits each register has, the more detailed horizontal time period settable can be realized.

FIG. 4 is a view illustrating an example of generating the horizontal times having different periods from each other according to various embodiments of the present disclosure.

Referring to FIG. 4, the display device 100 can perform displaying by using 720 gate lines. In addition, the frame can be divided into eight LHB sections. Then, in each LHB section, 90 gate lines can be controlled and 90 gate signals can be generated. Then, in the LHB #1 section, the horizontal time period can be 17.099 us as the VH1_1 is set to 5'b00000. In the LHB #2 section, the horizontal time period can be 17.266 us as the VH1_2 is set to 5'b01010. In the LHB #3 section, the horizontal time period can be 17.433 us as the VH1_3 is set to 5'b10100 (e.g., the timing for controlling one gate line can be increased by 0.167 us during each subsequent LHB section).

FIG. 5 is a view illustrating a circuit related to the generation of a horizontal synchronization signal for forming a variable period horizontal time according to various embodiments of the present disclosure.

Referring to FIG. 5, the timing controller 140 can generate a horizontal synchronization signal for each LHB section of each frame in a horizontal synchronization signal generator 510. According to an embodiment of the present disclosure, the horizontal synchronization signal generator 510 can acquire horizontal time period information from a horizontal time period register 520. The horizontal time period information for each LHB section for each frame is generated based on a current frame and a current LHB section. The horizontal synchronization signal generator 150 can generate a horizontal synchronization signal based on the corresponding horizontal time period information.

The generated horizontal synchronization signal is transmitted to a touch-enable generator 530. The touch-enable generator 530 can generate a touch-enable signal based on the horizontal synchronization signal.

The generated touch-enable signal is transmitted to multiplexers MUXs 541, 543, and 545, and can control whether to transmit a source data to the data line or to transmit a touch driving signal to the data line. In addition, the touch-enable signal can control whether to output a Vcom voltage to the touch electrode TE or to output the touch driving signal to the touch electrode TE. The touch-enable signal can be used to determine whether to output the gate signal to the gate line or to output the touch driving signal to the gate line. According to an embodiment, the Vcom voltage can be a Vcom voltage generally referred to in a liquid crystal display, but is not limited thereto. According to an embodiment, a first multiplexer 541 can be provided at the data driver 130 through a data line DL, a second multiplexer 543 can be provided at the touch driver 150 through a touch line TL, and a third multiplexer 545 can be provided at the gate driver 120 through a gate line GL.

According to an embodiment, a data-enable signal represents whether the data transmitted from the timing controller 140 to the data driver 130 is valid. In order to generate a data-enable signal, a counter can be used to count from zero to nine within a horizontal time section. However, when the horizontal time section becomes longer, the counter can malfunction when the counter counts ten instead of being initialized to zero after counting nine. In order to solve this problem of a variable horizontal time section, a circuit can be configured such that the counter is initialized to zero every time after the counter reaches nine.

In FIG. 5, an example of determining the period of the horizontal time that will be used in each LHB section by using the horizontal time period register 520 is illustrated. However, the period of the horizontal time that will be used in each LHB section can be determined without using the horizontal time period register 520.

According to an embodiment, each time the LHB section is changed, the period of the horizontal time of the corresponding LHB section can be set to be increased by a constant size from the period of the horizontal time of the previous LHB section (e.g., increase by 0.167 us). The period of the horizontal time of the corresponding LHB section also can be set to be decreased by a constant size after reaching the maximum settable period. According another embodiment, the minimum and maximum values of the period of the horizontal time that the LHB section can have can be set in advance. Or the period of the horizontal time of the corresponding LHB section can be set randomly by selecting a value from between the minimum value and the maximum value. The LHB section can be set to have a randomly selected horizontal time period, but the LHB section can be set to have a predetermined horizontal time period that is selected from among a plurality of different predetermined horizontal time periods.

FIG. 6 is a view illustrating examples of determining a horizontal time period by a method other than using a horizontal time period register in FIG. 5, in which the horizontal time period will be used in each LHB section.

The timing controller 140 can store different available horizontal time periods in correspondence with an index as shown in Table 2. For example, as shown in Table 2, the horizontal time period of 17.099 us in correspondence with index 0 (3'b000), the horizontal time period of 17.767 us in correspondence with index 4 (3'b100), and the horizontal time period of 18.268 us in correspondence with index 7 (3'b111) can be stored. In addition, the timing controller 140 can acquire a new index each time the LHB section is changed, and the horizontal time period in correspondence with the acquired index can be used in the corresponding LHB section.

Referring to FIG. 6, as a method of changing the index, the timing controller 140 can increase the index sequentially by one entry or spot as illustrated in (a) (e.g., in the form of a look-up table). Or the timing controller 140 can increase the index sequentially by two or three entries at a time as illustrated in (b) or (c). At this time, a remainder function can be used. That is, a remainder acquired by dividing the increased index by the number of stored horizontal time periods can be used as a new index. According to another embodiment, the timing controller 140 can use a random function to determine the index as illustrated in (d). According to still another embodiment, as illustrated in (e), the timing controller 140 can increase the index sequentially by one, and then decrease the index sequentially by one when the index is at the highest value thereof (for example, 3'b111).

FIG. 7 is a view illustrating a method of generating the variable period horizontal time by a timing controller, according to various embodiments of the present disclosure.

Referring to FIG. 7, in an operation S100, the timing controller 140 can set the period of the available horizontal time. According to an embodiment, the timing controller 140 can set the period of the available horizontal time as shown in Table 2 or Table 3.

In an operation S200, the timing controller 140 can determine the number of LHB sections in one frame. According to an embodiment, the timing controller 140 can determine the number of LHB sections in the frame to be an arbitrary number such as 8, 10, 12, 16, or the like.

In an operation S300, the timing controller 140 can set the horizontal time period to be used for each MB section in the frame (e.g., the horizontal time period can correspond to the timing for one pulse or one cycle of the Hsync signal used for controlling gate lines). According to an embodiment, the horizontal time period to be used for each LHB section can be set by selecting one of the available horizontal time periods set in the operation S100.

In addition, in the operation S200, the timing controller 140 can determine the number of repeated frames. According to an embodiment, the timing controller 140 can determine the number of repeated frames to be n, where n is a positive integer. Then, in the operation S300, the horizontal time period to be used for each LHB section for n frames can be set. Then, the horizontal time period at each MB section of a first frame can be the same as the horizontal time period at the corresponding LHB section of an n+1th frame (e.g., the pattern can be repeated over again starting at an n+1th frame).

According to another embodiment, in the operation S300, the timing controller 140 can use the horizontal time period to be used in each LHB section by changing the available horizontal time period set in the operation S100 one by one in the new LHB.

For example, in the operation S100, eight horizontal time periods shown in Table 2 can be set. The set horizontal time periods available in the LHB sections can be stored in correspondence with an index as shown in Table 2.

In the operation S200, the number of LHB sections in the frame can be determined to be 10.

Then, in the operation S300, the timing controller 140 can change the index each time the LHB section is changed, and can use the horizontal time period that corresponds to the changed index to generate a horizontal synchronization signal at the corresponding LHB section (e.g., in a look-up table manner). According to an embodiment, the timing controller 140 can increase the index sequentially by one, or can increase the index sequentially by two or three at a time. At this time, a remainder function can be used. That is, a remainder acquired by dividing the increased index by the number of stored horizontal time periods can be used as a new index. According to another embodiment, the timing controller 140 can use a random function to determine the index. According to still another embodiment, the timing controller 140 can increase the index sequentially by one, and then decrease the index sequentially by one when the index is at the highest value thereof (for example, 3'b111, and using a pattern that ramps up and then ramps down).

According to an example of sequentially increasing the index by one, a first LHB section of a first frame can be set to have a horizontal time period corresponding to 3'b000. A second LHB section of the first frame can be set to have a horizontal time period corresponding to 3'b001. A third LHB section of the first frame can be set to have a horizontal time period corresponding to 3'b010. A fourth LHB section of the first frame can be set to have a horizontal time period corresponding to 3'b011. A fifth LHB section of the first frame can be set to have a horizontal time period corresponding to 3'b100. A sixth MB section of the first frame can be set to have a horizontal time period corresponding to 3'b101. A seventh LHB section of the first frame can be set to have a horizontal time period corresponding to 3'b110. An eighth LHB section of the first frame can be set to have a horizontal time period corresponding to 3'b111. Then, by starting again from the beginning, a ninth LHB section of the first frame can be set to have a horizontal time period corresponding to 3'b000, and a tenth LHB section of the first frame can be set to have a horizontal time period corresponding to 3'b001. Then, a first LHB section of a second frame that is a next frame can be set to have a horizontal time period corresponding to 3'b010.

According to another embodiment of changing the index in a pattern in which the index is increased by one and then decreased by one after reaching the maximum value in order to prevent a large change in the horizontal time period between neighboring LHB sections (e.g., ramping up and then ramping down), a ninth LHB section of a first frame can be set to have a horizontal time period corresponding to 3'b110 instead of 3'b000. Further, a tenth LHB section of the first frame can be set to have a horizontal time period corresponding to 3'b101. Then, a first LHB section of a second frame that is a next frame can be set to have a horizontal time period corresponding to 3'b100.

In operation S400, the timing controller 140 can generate a horizontal synchronization signal to allow each LHB section to have a set horizontal time period.

Operations described in FIG. 7 illustrate a method of selecting a horizontal time period from preset horizontal time periods, but the horizontal time period can be set randomly.

According to an embodiment, each time the LHB section is changed, the horizontal time period of corresponding LHB section can be set to be increased by a constant size relative to the horizontal time period of the previous LHB section, and can be set to be decreased by a constant size after reaching the maximum settable period. Here, the increasing size and the decreasing size can be different from each other. According to another embodiment, the minimum and maximum values of the horizontal time period that the LHB section can have can be set in advance, and the horizontal time period of the LHB section can be set randomly by selecting a value from between the minimum value and the maximum value.

As described above, in the method and the apparatus proposed in the present specification, EMI noise can be mitigated by changing a horizontal synchronization signal having a constant cycle to have a variable cycle that can change from LHB section to LHB section.

What is claimed is:

1. A display device comprising:
    a display panel including a plurality of pixels and touch electrodes configured to sense a touch input; and
    a timing controller configured to:
    generate a vertical synchronization signal and a horizontal synchronization signal for controlling the display panel to display an image based on an image signal, and
    adjust the horizontal synchronization signal by varying a horizontal time period corresponding to a time period interval for individual cycles of the horizontal synchronization signal,
    wherein a frame section between a start of one cycle of the vertical synchronization signal and a start of a next cycle of the vertical synchronization signal comprises a plurality of long horizontal blank (LHB) sections,
    each of the plurality of LHB sections including a display driving section for controlling the display panel to display the image signal based on the horizontal synchronization signal and a touch driving section for controlling a touch driving signal to be sent to the touch electrodes of the display panel, and
    wherein the timing controller is further configured to adjust the horizontal synchronization signal to set at least some of the plurality of LHB sections to have horizontal time periods that are different from each other.

2. The display device of claim 1, wherein the timing controller is further configured to adjust the horizontal synchronization signal to set at least some of the plurality LHB sections provided in a plurality of frame sections to have horizontal time periods that are different from each other.

3. The display device of claim 1, wherein the timing controller is further configured to:
    determine a horizontal time period of a changed LHB section by adding a first predetermined amount of time to a horizontal time period used in a previous LHB section, or by subtracting a second predetermined amount of time from the horizontal time period used in the previous LHB period.

4. The display device of claim 1, wherein the timing controller is further configured to:
    determine a horizontal time period of a changed LHB section by randomly selecting an amount of time for the horizontal time period for the changed LHB section that is between a predetermined minimum horizontal time period and a predetermined maximum horizontal time period,
    the predetermined maximum horizontal time period being an amount of time that is longer than the predetermined minimum horizontal time period.

5. The display device of claim 1, wherein the timing controller comprises:
    a horizontal time period register configured to store horizontal time period information for at least one of the plurality of LHB sections; and
    a horizontal synchronization signal generator configured to generate the horizontal synchronization signal based on the horizontal time period information stored in the horizontal time period register.

6. The display device of claim 5, further comprising:
    a data driver configured to output a data signal to each of a plurality of data lines of the display panel;
    a gate driver configured to output a gate signal to each of a plurality of gate lines of the display panel; and
    a touch driver configured to provide a touch driving signal to the touch electrodes of the display panel,
    wherein the timing controller further comprises a touch-enable generator configured to generate a touch-enable signal that indicates the display driving section and the touch driving section based on the horizontal synchronization signal generated by the horizontal synchronization signal generator,
    wherein the data driver outputs the data signal and the touch driving signal to the plurality of data lines based on the touch-enable signal,
    wherein the touch driver outputs a common voltage or the touch driving signal to the touch electrodes based on the touch-enable signal, and
    wherein the gate driver outputs the gate signal and the touch driving signal to the plurality of gate lines based on the touch-enable signal.

7. The display device of claim 1, wherein the timing controller comprises:
    a register configured to store available horizontal time periods in correspondence with an index; and
    a horizontal synchronization signal generator configured to:
    select a different entry in the index each time one of the plurality of LHB sections is changed,
    acquire a horizontal time period received from the register based on the different entry selected from the index, and
    generate the horizontal synchronization signal based on information related to the horizontal time period received from the register.

8. The display device of claim 7, wherein the horizontal synchronization signal generator is further configured to change the index to a new index, the new index being a remainder acquired by increasing the index by a natural number and dividing the index by a number of available horizontal time periods.

9. The display device of claim 7, wherein the horizontal synchronization signal generator is further configured to select entries in the index by traversing the index in a pattern that ramps up to a maximum value and then ramps down from the maximum value.

10. A method of controlling a touch display device, the method comprising:
    generating, by a timing controller in the touch display device, a vertical synchronization signal and a horizontal synchronization signal for controlling a display panel in the touch display device to display an image based on an image signal;

adjusting, by the timing controller, the horizontal synchronization signal by varying a horizontal time period corresponding to a time period interval for individual cycles of the horizontal synchronization signal; and dividing a frame section into a plurality of long horizontal blank (LHB) sections, each of the plurality of LHB sections including a display driving section for controlling the display panel to display the image signal based on the horizontal synchronization signal and a touch driving section for controlling a touch driving signal to be sent to touch electrodes of the display panel, wherein the adjusting the horizontal synchronization signal includes setting at least some of the plurality of LHB sections to have horizontal time periods that are different from each other.

11. The method of claim 10, wherein the adjusting the horizontal synchronization signal comprises:

determining a horizontal time period of a changed LHB section by adding a first predetermined amount of time to a horizontal time period used in a previous LHB section, or by subtracting a second predetermined amount of time from the horizontal time period used in the previous LHB period; and adjusting the horizontal synchronization signal to set the changed LHB section to have the determined horizontal time period.

12. The method of claim 10, wherein the adjusting the horizontal synchronization signal comprises:

determining a horizontal time period of a changed LHB section by randomly selecting an amount of time for the horizontal time period for the changed LHB section that is between a predetermined minimum horizontal time period and a predetermined maximum horizontal time period, the predetermined maximum horizontal time period being an amount of time that is longer than the predetermined minimum horizontal time period; and adjusting the horizontal synchronization signal to set the changed LHB section to have the determined horizontal time period.

13. The method of claim 10, further comprising:

setting horizontal time period information for controlling plurality of LHB sections, wherein the adjusting the horizontal synchronization signal includes varying the horizontal time periods based on the horizontal time period information.

14. The method of claim 10, further comprising:

storing horizontal time period information for at least one of the plurality of LHB sections in a horizontal time period register; and generating, by a horizontal synchronization signal generator in the touch display device, the horizontal synchronization signal based on the horizontal time period information stored in the horizontal time period register.

15. The method of claim 10, further comprising:

outputting a data signal to each of a plurality of data lines of the display panel;

outputting a gate signal to each of a plurality of gate lines of the display panel;

providing a touch driving signal to touch electrodes in the touch display device; and generating a touch-enable signal, by a touch-enable generator in a timing controller, that indicates the display driving section and the touch driving section based on the horizontal synchronization signal generated by a horizontal synchronization signal generator, wherein the data signal and the touch driving signal are output to the plurality of data lines based on the touch-enable signal, wherein a common voltage or the touch driving signal is output to the touch electrodes based on the touch-enable signal, and wherein the gate signal and the touch driving signal are output to the plurality of gate lines based on the touch-enable signal.

16. The method of claim 10, further comprising:

storing, in a register in the touch display device, available horizontal time periods in correspondence with an index;

selecting, by a horizontal synchronization signal generator in the touch display device, different entry in the index each time one of the plurality of LHB sections is changed;

acquiring a horizontal time period received from the register based on the different entry selected from the index; and generating the horizontal synchronization signal based on information related to the horizontal time period received from the register.

17. The method of claim 16, further comprising:

changing the index to a new index, wherein the new index is a remainder acquired by increasing the index by a natural number and dividing the index by a number of available horizontal time periods.

18. The method of claim 17, further comprising:

selecting entries in the index by traversing the index in a pattern that ramps up to a maximum value and then ramps down from the maximum value.

* * * * *